US012039863B2

(12) United States Patent
Meads, Jr. et al.

(10) Patent No.: US 12,039,863 B2
(45) Date of Patent: Jul. 16, 2024

(54) TRAIN DETECTION AND ALERT SYSTEM

(71) Applicant: Gresham Smith, Nashville, TN (US)

(72) Inventors: Adrian Meads, Jr., Baton Rouge, LA (US); Julian Bordelon, Baton Rouge, LA (US); Kendra McCoy, Baton Rouge, LA (US); Douglas Smith, Alpharetta, GA (US); Christina Florez, Birmingham, AL (US); Herbert Moore, II, Baton Rouge, LA (US)

(73) Assignee: Gresham Smith, Nashville, TN (US)

( * ) Notice: Subject to any disclaimer, the term of this patent is extended or adjusted under 35 U.S.C. 154(b) by 45 days.

(21) Appl. No.: 17/696,235

(22) Filed: Mar. 16, 2022

(65) Prior Publication Data

US 2022/0301420 A1 Sep. 22, 2022

Related U.S. Application Data

(60) Provisional application No. 63/161,532, filed on Mar. 16, 2021.

(51) Int. Cl.
*G08G 1/017* (2006.01)
*G08G 1/0969* (2006.01)

(52) U.S. Cl.
CPC ........... *G08G 1/017* (2013.01); *G08G 1/0969* (2013.01)

(58) Field of Classification Search
CPC ............................. G08G 1/017; G08G 1/0969
See application file for complete search history.

(56) References Cited

U.S. PATENT DOCUMENTS

| | | | | |
|---|---|---|---|---|
| 7,196,636 | B2 | 3/2007 | Graham | |
| 8,157,218 | B2 | 4/2012 | Riley et al. | |
| 8,941,510 | B2 | 1/2015 | Burnison et al. | |
| 2013/0200223 | A1 | 8/2013 | Alexander et al. | |
| 2016/0229435 | A1 * | 8/2016 | Ryan | B61L 29/24 |
| 2019/0145791 | A1 * | 5/2019 | Rempel | G08G 1/0116 701/410 |
| 2020/0001906 | A1 | 1/2020 | Bramucci et al. | |
| 2021/0107545 | A1 * | 4/2021 | Howard | B61L 27/16 |
| 2022/0242467 | A1 * | 8/2022 | Guibene | B61L 25/021 |

FOREIGN PATENT DOCUMENTS

| | | |
|---|---|---|
| DE | 2942933 | 5/1981 |
| DE | 102014217194 | 3/2016 |
| WO | WO2018053673 | 3/2018 |

* cited by examiner

*Primary Examiner* — Curtis A Kuntz
*Assistant Examiner* — James E Munion
(74) *Attorney, Agent, or Firm* — Spencer Fane LLP; Steven J. Laureanti

(57) ABSTRACT

A system and method are disclosed to provide train detection and alerts. Embodiments include monitoring train status data, detecting a presence of a train based on the train status data, capturing current train data and converting the current train data and mapping device location data from one or more mapping devices into train metrics. Embodiments estimate an arrival time of the train at a railroad crossing and a duration of the train at the railroad crossing, check the current train data for errors, apply rules to the current train data to validate the current train data and generate an alert in response to the rules being satisfied. Embodiments display the alert on the one or more mapping devices to notify one or more corresponding users of the one or more mapping devices of the presence of the train.

20 Claims, 6 Drawing Sheets

400

TRAIN DETECTION AND ALERT SYSTEM

CROSS-REFERENCE TO RELATED APPLICATIONS

The present disclosure is related to that disclosed in the U.S. Provisional Application No. 63/161,532 filed Mar. 16, 2021, entitled "Autonomous Multi-Dimension Segmentation Workflow. U.S. Provisional Application No. 63/161,532 is assigned to the assignee of the present application. The subject matter disclosed in U.S. Provisional Application No. 63/161,532 is hereby incorporated by reference into the present disclosure as if fully set forth herein. The present invention hereby claims priority under 35 U.S.C. § 119(e) to U.S. Provisional Application No. 63/161,532.

TECHNICAL FIELD

The present disclosure relates generally to systems and methods of alerting motorists and other users to the presence and duration of a train approaching, departing or blocking a roadway.

BACKGROUND

In many localities, trains cause motorist significant delays. Traditional solutions attempted to alert motorists by communicating the event or potential event of a blocked railroad grade crossing to various users. However, these solutions are often overly complex in that it relies on consulting databases, which, among other things, are not reliable nor easy-to-use. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
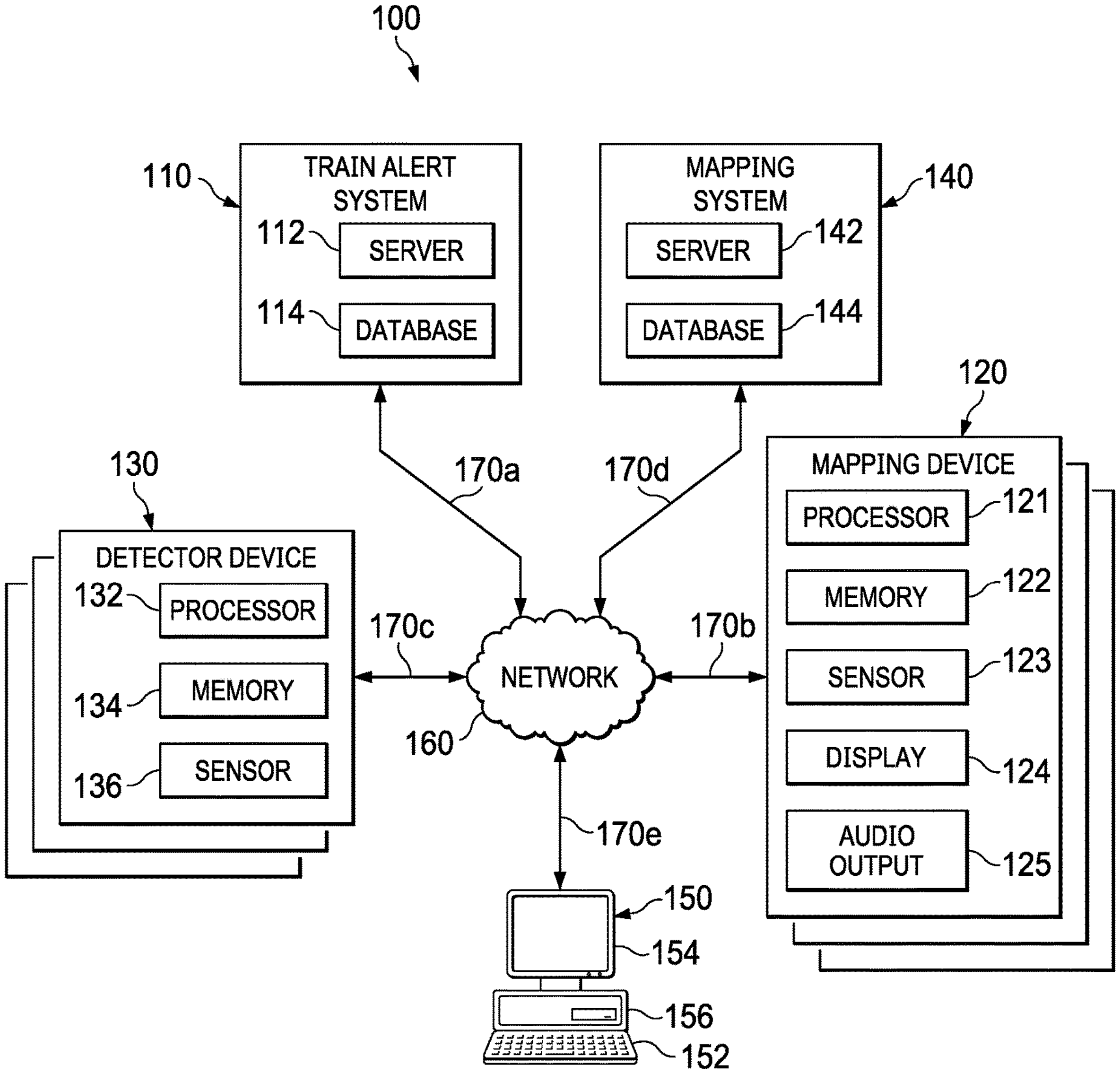
FIG. 1 illustrates an exemplary train detection and alert network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide train detection and alert systems and methods for detecting trains, capturing train data, converting train data to train metrics and train estimations, and sending conditional alerts to mapping devices. Embodiments utilize a plurality of detector devices to receive status data regarding the presence of a train at one or more sensor locations and to transmit train data to a train alert system when a train is present at any sensor location. Embodiments of the train detection and alert system capture train data transmitted from any detector device, convert train data to train metrics, estimate train arrival and duration, check for and correct errors in train metrics and estimates. Embodiments of the train detection and alert system receive a mapping device location from a mapping system, determine when the mapping device satisfies particular conditions, and, when conditions are met, send alerts to the mapping device including various user alert visualizations.

FIG. 1 illustrates an exemplary train detection and alert network, in accordance with a first embodiment. Train detection and alert network 100 comprises train alert system 110, one or more mapping devices 120, one or more detector devices 130, mapping system 140, computer 150, network 160, and communication links 170*a*-170*e*. Although a single train alert system 110, one or more mapping devices 120, one or more detector devices 130, a single mapping system 140, a single computer 150, and a single network 160 are shown and described, embodiments contemplate any number of train alert systems 110, mapping devices 120, detector devices 130, mapping systems 140, computers 150, or networks 160, according to particular needs.

In one embodiment, train alert system 110 comprises server 112 and database 114. As described in more detail below, train alert system 110 comprises one or more modules to, for example, capture train data, convert train data to metrics, estimate train arrival time and duration at a crossing, check for and correct errors in the train metrics and estimates, receive mapping device location associated with a user from mapping system 140, determine when one or more mapping devices 120 satisfy particular conditions, and, when conditions are met, send alerts to one or more mapping devices 120 including visualizations of train location map overlays and visualizations of roadway crossings with the train direction, time of arrival, duration of passing, alternate routing, and/or extended blockage.

One or more mapping devices 120 are electronic devices comprising one or more processors 121, memory 122, one or more sensors 123, one or more displays 124, one or more audio outputs 125, and may include any suitable input device, output device, fixed or removable computer-readable storage media, or the like. According to embodiments, one or more mapping devices 120 comprise an electronic device that receives alerts displaying information related to the location and movement of a train from train alert system 110. According to embodiments, one or more mapping devices 120 may visualize on one or more displays 124 the location of a train traveling on a track toward an intersection with a roadway and alternate routes to avoid the train, overlaying a map displaying the roadway. The alerts displayed on one or more mapping devices 120 may include the direction the train is moving, the estimated time until the train arrives at the intersection, the estimated time until the train clears the intersection, alternate routes to avoid the train, or whether an extended blockage has occurred.

One or more mapping devices 120 may comprise a mobile handheld electronic device such as, for example, a smartphone, a tablet computer, a wireless device, or the like. One or more displays 124 of one or more mapping devices 120 may comprise a LCD screen, projector, monitor, or any other suitable electronic display device. According to some embodiments, one or more mapping devices 120 comprise one or more audio outputs 125, such as, for example, a speaker that generates auditory feedback in response to receiving an alert, a change to an alert, or the like.

According to embodiments, one or more detector devices 130 comprise an electronic device that measures train presence and speed and sends status data packets and train data to train alert system 110. According to embodiments, one or more detector devices 130 comprise one or more processors 132, memory 134, and one or more sensors 136, and may include any suitable input device, output device, fixed or removable non-transitory computer-readable storage media, or the like. In addition, or as an alternative, one or more sensors 136 may comprise a object detection sensor, such as, for example, a radar system, an imaging sensor, a camera, a LIDAR system, an infrared detector, a sonar system, or any other electronic component that detects characteristics of physical objects such as, for example, directionality, speed, distance, and the like. An exemplary detector device 130 may be, for example, a Matrix Rail detection unit. The exemplary detector device 130 may include, for example, a matrix of radars for bi-directional traffic detection at a four-quadrant gate through a ninety degree field of view, and having the ability to detect and track the real-time presence of both moving and stopped vehicles. Although a specific detector device 130 is described as a Matrix Rail detection unit, embodiments contemplate any similar device operating in a similar manner. Additionally, one or more sensors 136 of one or more detector devices 130 may be located at one or more locations local to, or remote from, the one or more detector devices 130, including, for example, one or more sensors 136 integrated into one or more detector devices 130 and/or one or more sensors 136 distantly located from one or more detector devices 130 and communicatively coupled to the one or more detector devices 130.

According to embodiments, one or more mapping systems 140 comprise server 142 and database 144. According to embodiments, server 142 determines the location of one or more mapping devices 120, whether one or more mapping devices 120 are in a vehicle, and generates map visualizations, according to particular needs. By way of example only and not by way of limitation, server 142 of one or more mapping systems 140 comprises a mobile application server that receives information related to the location and movement of a train from train alert system 110 and sends the information related to the location and movement of a train, location of one or more mapping devices 120, and map visualizations to mobile applications running on one or more mapping devices 120.

As shown in FIG. 1, train detection and alert network 100 operates on one or more computers 150 that are integral to or separate from the hardware and/or software that support train alert system 110, one or more mapping devices 120, one or more detector devices 130, and mapping system 140. Train detection and alert network 100 comprising train alert system 110, one or more mapping devices 120, one or more detector devices 130, and mapping system 140 may operate on one or more computers 150 that are integral to or separate from the hardware and/or software that support train alert system 110, one or more mapping devices 120, one or more detector devices 130, and mapping system 140. One or more computers 150 may include any suitable input device 152, such as a keypad, mouse, touch screen, microphone, or other device to input information. One or more computers 150 may also include any suitable output device 154, such as, for example, a computer monitor, that may convey information associated with the operation of train detection and alert network 100, including digital or analog data, visual information, or audio information. Computer 150 may include fixed or removable computer-readable storage media, including a non-transitory computer readable medium, magnetic computer disks, flash drives, CD-ROM, in-memory device or other suitable media to receive output from and provide input to train detection and alert network 100.

Computer 150 may include one or more processors 156 and associated memory to execute instructions and manipulate information according to the operation of train detection and alert network 100 and any of the methods described herein. One or more processors 156 may execute an operating system program stored in memory to control the overall operation of computer 150. For example, one or more processors 156 control the reception and transmission of signals within the system. One or more processors 156 execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, train detection and alert network 100 may comprise a cloud-based computing system having processing and storage devices at one or more locations, local to, or remote from train alert system 110, one or more mapping devices 120, one or more detector devices 130, and mapping system 140. In addition, each of one or more computers 150 may be a work station, personal computer (PC), network computer, notebook computer, tablet, personal digital assistant (PDA), cell phone, telephone, smartphone, wireless data port, or any other suitable computing device. In an embodiment, one or more users may be associated with train alert system 110, one or more mapping devices 120, one or more detector devices 130, and mapping system 140.

In one embodiment, each of train alert system 110, one or more mapping devices 120, one or more detector devices 130, mapping system 140, and computer 150 may be coupled with network 160 using communication links 170*a*-170*e*, which may be any wireline, wireless, or other link suitable to support data communications between train alert system 110 and network 160 during operation of train detection and alert network 100. Although communication links 170*a*-170*e* are shown as generally coupling train alert system 110, one or more mapping devices 120, one or more detector devices 130, mapping system 140, and computer 150 to network 160, any of train alert system 110, one or more mapping devices 120, one or more detector devices 130, mapping system 140, and computer 150 may communicate directly with each other, according to particular needs.

In another embodiment, network 160 includes the Internet and any appropriate local area networks (LANs), metropolitan area networks (MANs), or wide area networks (WANs) coupling train alert system 110, one or more mapping devices 120, one or more detector devices 130, mapping system 140, and computer 150. For example, data may be maintained locally to, or externally of train alert system 110, one or more mapping devices 120, one or more detector devices 130, mapping system 140, and computer 150 and made available to one or more associated users of train alert system 110, one or more mapping devices 120, one or more detector devices 130, mapping system 140, and computer 150 using network 160 or in any other appropriate manner. For example, data may be maintained in a cloud database at one or more locations external to train alert system 110, one or more mapping devices 120, one or more detector devices 130, mapping system 140, and computer 150 and made available to one or more associated users of train alert system 110, one or more mapping devices 120, one or more detector devices 130, mapping system 140, and computer 150 using the cloud or in any other appropriate manner. Those skilled in the art will recognize that the complete structure and operation of network 160 and other components within train detection and alert network 100 are not depicted or described. Embodiments may be employed in conjunction with known communications networks and other components.

Figure 2:
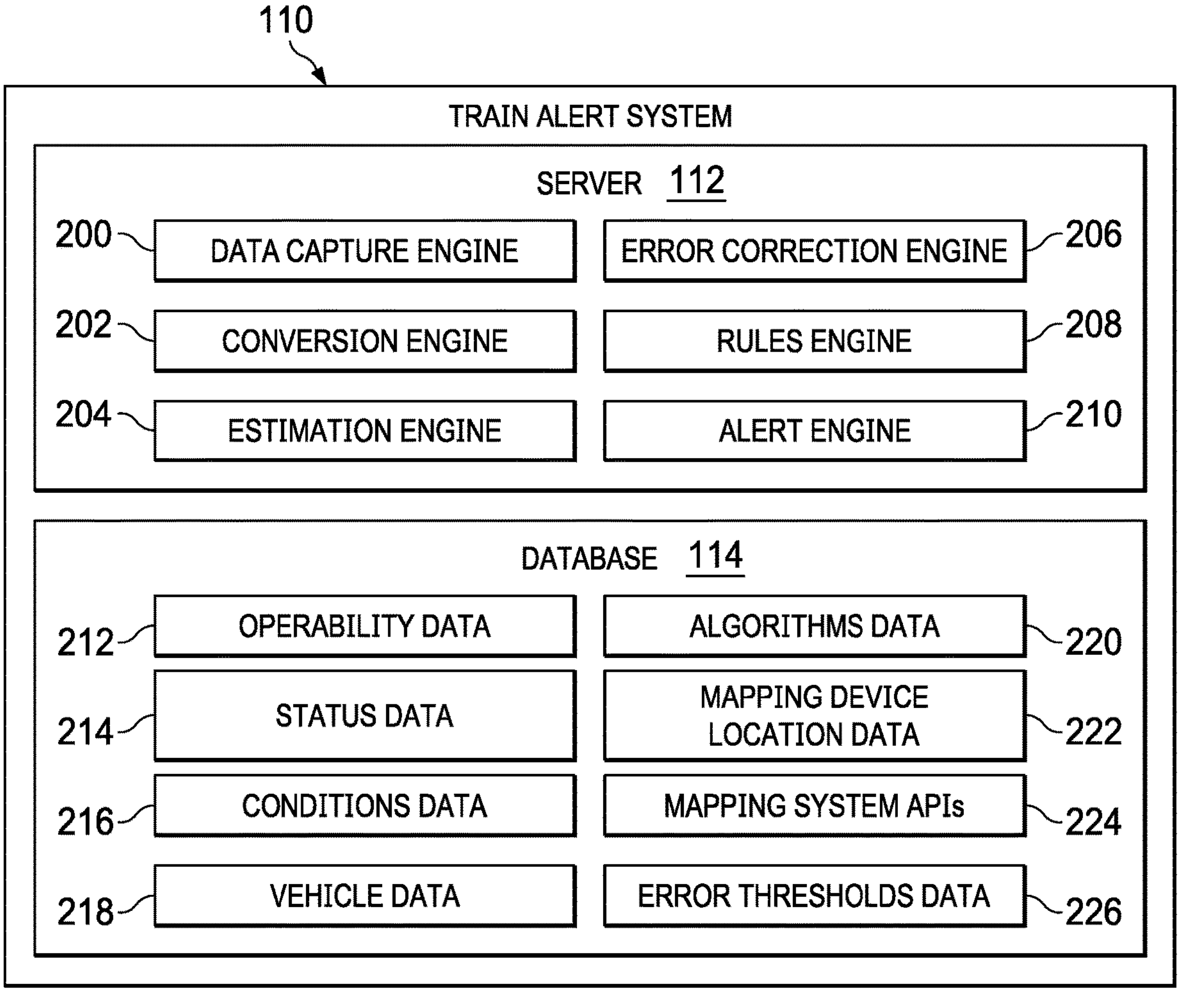
FIG. 2 illustrates the train alert system of FIG. 1 in greater detail, in accordance with an embodiment.

FIG. 2 illustrates the train alert system of FIG. 1 in greater detail, in accordance with an embodiment. As described above, train alert system 110 may comprise one or more computers 150 at one or more locations including associated input devices 152, output devices 154, non-transitory computer-readable storage media, processors 156, memory, or other components for receiving, processing, storing, and communicating information according to the operation of train detection and alert network 100. Additionally, train alert system 110 comprises server 112 and database 114. Although train alert system 110 is shown as comprising single server 112 and single database 114, embodiments contemplate any suitable number of computers 150, servers 112, or databases 114 internal to or externally coupled with train alert system 110.

Server 112 of train alert system 110 may comprise data capture engine 200, conversion engine 202, estimation engine 204, error correction engine 206, rules engine 208, and alert engine 210. Although server 112 is illustrated and described as comprising a single user data capture engine 200, conversion engine 202, estimation engine 204, error correction engine 206, rules engine 208, and alert engine 210, embodiments contemplate any suitable number or combination of these located at one or more locations, local to, or remote from train alert system 110, such as on multiple servers 112 or computers 150 at any location in train detection and alert network 100.

According to embodiments, data capture engine 200 receives data, such as, for example, operability of one or more sensors 136, one or more status data packets, and train data from one or more detector devices 130. Data capture engine 200 may also use code in mapping systems APIs 224 stored in train alert system database 114 to communicate with mapping system 140 to retrieve the location of one or more mapping devices 120 and whether one or more mapping devices 120 are in a motor vehicle. Having received the data, data capture engine 200 may store the operability of one or more sensors 136 in operability data 212, the one or more status data packets in status data 214, whether one or more mapping devices 120 are in a motor vehicle in vehicle data 218, and the location of one or more mapping devices 120 in mapping device location data 222 of train alert system database 114.

According to an embodiment, when one or more status data packets indicate that a train is present at the location of one or more sensors 136, data capture engine 200 begins to receive train data from the associated one or more detector devices 130. When one or more status data packets indicate that a train is absent, data capture engine 200 may use mapping systems APIs 224 to communicate to mapping system 140 that no train is approaching an intersection. According to an embodiment, train data is stored only in cache of one or more processors 156 and/or memory of computer 150, not stored in database 114.

Conversion engine 202 may access train data stored in cache of one or more processors 156 and/or associated memory of computer 150, status data 214 and mapping device location data 222, and may transform train data and mapping device location data 222 to generate one or more train metrics using one or more algorithms stored in algorithms data 220 stored in train alert system database 114. According to an embodiment, one or more train metrics comprise train presence, train location, train speed, train directionality, train length, train extended blockage, train reversal, and the distance between one or more mapping devices 120 and a particular location. Having generated one or more train metrics, conversion engine 202 may store one or more train metrics only in cache of one or more processors 156 and/or associated memory of computer 150, not in database 114.

Estimation engine 204 may access train data and one or more train metrics stored in cache of one or more processors 156 and/or associated memory of computer 150 and may transform train data and one or more train metrics to generate one or more train estimations using one or more algorithms stored in algorithms data 220. According to an embodiment, train estimations comprise the estimated time until the train arrives at the intersection (crossing arrival time), the estimated time until the train clears the intersection (crossing clear time), and the estimated time until the one or more mapping devices 120 arrive at the intersection. According to an embodiment, when one or more train metrics indicate a train is stopped, estimation engine 204 will cease estimating crossing clear time until the train has cleared the intersection. Having generated one or more train estimations, estimation engine 204 may store one or more train estimations only in cache of one or more processors 156 and/or associated memory of computer 150, not in database 114.

Error correction engine 206 may retrieve current train data from one or more detector devices 130 and compare current train data to previous train data stored in cache of one or more processors 156 and/or associated memory of computer 150 to generate a train data variation. Error correction engine 206 may compare the train data variation to an error threshold stored in error thresholds data 226 and, when the train data variation exceeds the error threshold, may communicate to conversion engine 202 to generate one or more updated train metrics and to estimation engine 204 to generate one or more updated train estimations. According to an embodiment, updated train data, one or more updated train metrics, and one or more updated train estimations will overwrite previous train data, one or more previous train metrics, and one or more previous train estimations stored in cache of one or more processors 156 and/or associated memory of computer 150.

Rules engine 208 may access one or more rules stored in conditions data 216 of train alert system database 114 that define whether one or more mapping devices 120 will receive one or more alerts from alert engine 210. Rules engine 208 may access vehicle data 218, mapping device location data 222, and one or more train metrics and, when one or more rules are violated, may communicate to alert engine 210 that one or more alerts should not be sent to one or more mapping devices 120 associated with a violation.

Alert engine 210 may access one or more train estimations stored in cache of one or more processors 156 and/or associated memory of computer 150 and may send one or more alerts to one or more mapping devices 120 for visualization on display 124. According to an embodiment, one or more alerts comprise text indicating the estimated time until the train arrives at the intersection of interest, the estimated time until the train clears the intersection of interest, text indicating the estimated time until the one or more mapping devices 120 arrive at the intersection of interest, alternate routes to avoid an incoming or passing train at the intersection of interest, and/or an extended blockage at the intersection of interest.

According to an embodiment, alert engine 210 may also use mapping systems APIs 224 to communicate with mapping system 140 to retrieve one or more maps, overlay train location and train directionality onto the one or more maps, and may send the one or more maps to one or more mapping devices 120 for visualization on display 124. By way of example only and not by way of limitation, the one or more maps may also display one or more roadways, one or more intersections (including an intersection of interest), locations of one or more sensors 136, and locations of one or more mapping devices 120. Alert engine 210 may also access operability data 212 and, when one or more sensors 136 are inoperable, may send an alert that the train alert system 110 has a service issue.

Database 114 of train alert system 110 may comprise one or more databases or other data storage arrangements at one or more locations, local to, or remote from, server 112. Database 114 may comprise, for example, operability data 212, status data 214, conditions data 216, vehicle data 218, algorithms data 220, mapping device location data 222, mapping system APIs 224, and error thresholds data 226. Although database 114 is shown and described as comprising operability data 212, status data 214, conditions data 216, vehicle data 218, algorithms data 220, mapping device location data 222, mapping system APIs 224, and error thresholds data 226, embodiments contemplate any suitable number or combination of these, located at one or more locations, local to, or remote from, train alert system 110 according to particular needs.

Operability data 212 may comprise, for example, any data indicating whether one or more sensors 136 are functioning. Data capture engine 200 may use operability data 212 to cease capturing train data when one or more sensors 136 are not functioning. As described above, alert engine may also use operability data 212 to send an alert to one or more mapping devices 120 that the train alert system 110 has a service issue at a particular sensor location which may affect one or more alerts for an intersection of interest. Status data 214 may comprise, for example, any data indicating the absence of a train at a particular sensor location. Data capture engine 200 may use status data 214 to begin capturing train data.

Conditions data 216 may comprise rules preventing alert engine 210 from sending one or more alerts to a particular mapping device 120 when that device, for example, is not within a predetermined distance from an intersection of interest, not on a particular road, not in an operating motor vehicle, or that device has not elected to receive alerts. Rules engine 206 may use any number or combination of rules in conditions data 216 according to particular needs. Vehicle data 218 may comprise, for example, any data indicating whether one or more mapping devices 120 are located in an operating motor vehicle.

Algorithms data 220 may comprise an algorithm that performs physics-based calculations to generate train metrics and train estimations, such as, for example, time, velocity, and distance formulas that determine linear movement along the track (for example, speed=distance/time, distance=speed×time), slope-intercept formula that determines the next latitude and longitude of the train's position (for example, $\text{longitude}=m(\text{latitude}-\text{latitude}_1)+\text{longitude}_1$), arc length formula that converts the distance traveled by the train into an angular distance (for example, angular distance traveled=(180×distance)/(π×radius of the Earth)), and Pythagorean Theorem formula used in conjunction with arc length and angular distance formulas to determine the latitude and longitude of the train's position (for example, $(\text{angular distance traveled})=(\text{latitude}—\text{latitude}_1)^2+(\text{longitude}—\text{longitude}_1)^2$).

Mapping device location data 222 may comprise any data indicating the location of one or more mapping devices 120, including, for example, GPS, cell tower triangulation, Bluetooth, or the like. Mapping system APIs 224 may comprise code used by train alert system 110 to communicate with mapping system 140 and retrieve any geolocation data, including, for example, vehicle data 218, mapping device location data, one or more maps, or the like. Error thresholds data 226 may comprise any number of limits for train data variation, including, for example, variation no greater than 1%, 5%, or 10%, according to particular needs.

Figure 3:
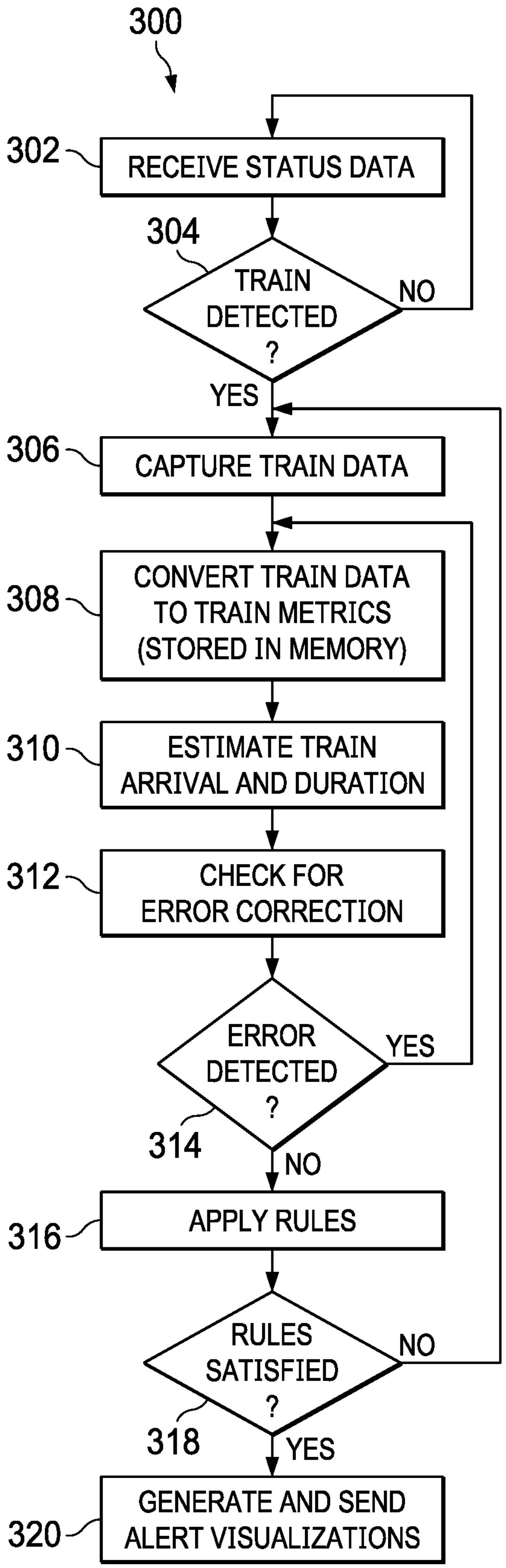
FIG. 3 illustrates an exemplary train detection and alert visualization method in which the train alert system detects a train and sends information about the train to one or more mapping devices, in accordance with an embodiment.

FIG. 3 illustrates an exemplary train detection and alert visualization method in which the train alert system detects a train and sends information about the train to one or more mapping devices, in accordance with an embodiment. Train detection and alert visualization method 300 proceeds by one or more activities, which although described in a particular order may be performed in one or more permutations, combinations, orders, or repetitions, according to particular needs.

At activity 302 of train detection and alert visualization method 300, data capture engine 200 receives data including operability of one or more sensors 136 and one or more status data packets from one or more detector devices 130. Data capture engine 200 stores data including operability of one or more sensors 136 in operability data 212 and one or more status data packets in status data 214 of train alert system database 114. When one or more status data packets indicate that a train is absent, data capture engine 200 communicates to mapping system 140, using mapping systems APIs 224, that no train is approaching an intersection.

At activity 304 of train detection and alert visualization method 300, data capture engine 200 determines whether a train is detected. When data capture engine 200 receives operability data indicating that one or more sensors 136 are functioning and one or more status data packets from one or more detector devices 130 indicating that a train is present, train alert system 110 proceeds to activity 306 of train detection and alert visualization method 300 and captures train data. when data capture engine 200 receives operability data indicating that one or more sensors 136 are not functioning or one or more status data packets from one or more detector devices 130 indicating that a train is absent, train alert system 110 returns to activity 302 of train detection and alert visualization method 300 and waits to receive data including operability of one or more sensors 136 and one or more status data packets from one or more detector devices 130.

Figure 5:
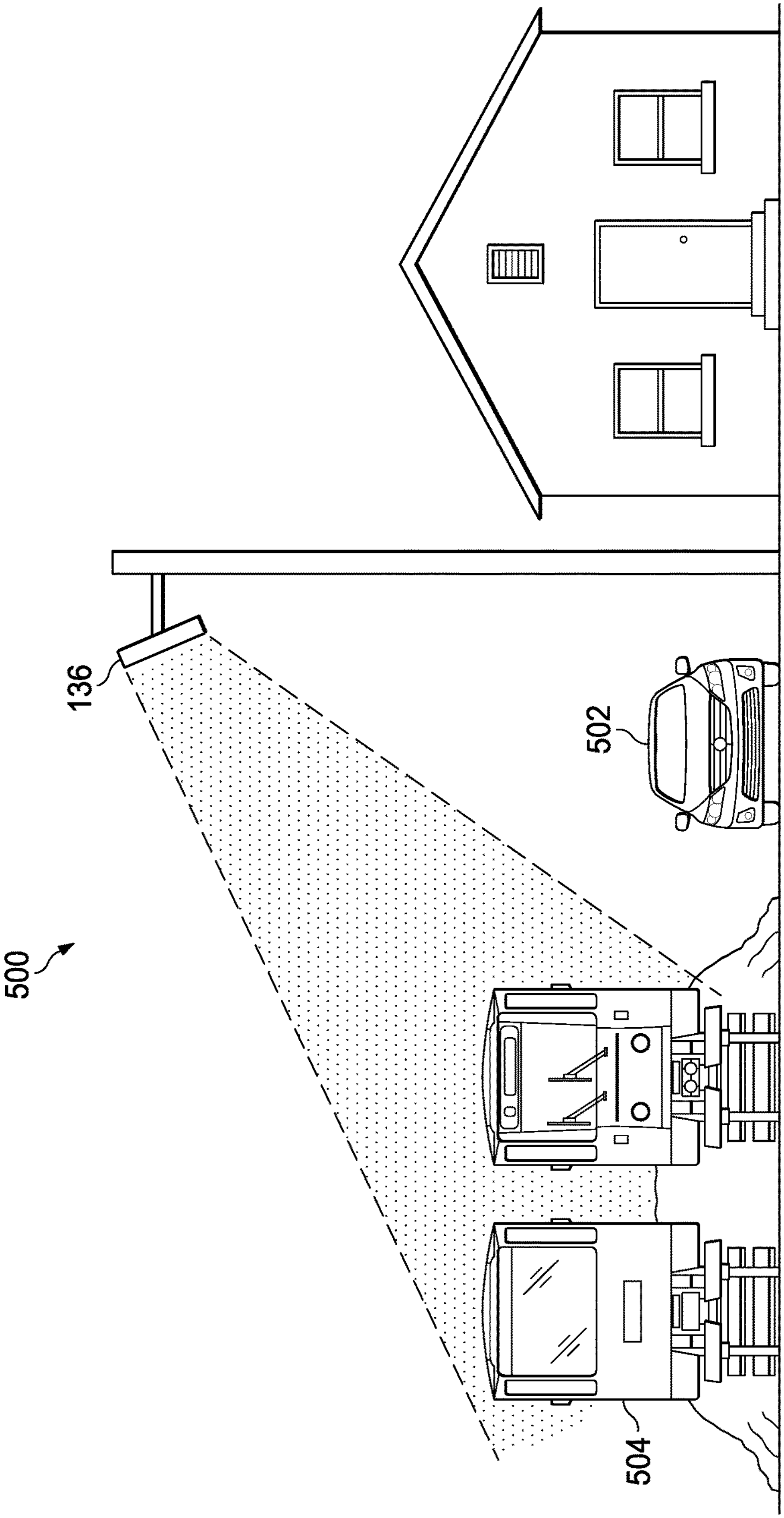
FIG. 5 illustrates an exemplary data capture arrangement, in accordance with an embodiment.

At activity 306 of train detection and alert visualization method 300, data capture engine 200 captures train data and retrieves the location of one or more mapping devices 120 and whether one or more mapping devices 120 are in a motor vehicle from mapping system 140 using mapping system APIs 224, illustrated by FIG. 5. Data capture engine 200 stores the location of one or more mapping devices 120 in mapping device location data 222 and whether one or more mapping devices 120 are in a motor vehicle in vehicle data 218. Data capture engine 200 stores train data in cache of one or more processors 156 and/or associated memory of computer 150, not in database 114.

At activity 308 of train detection and alert visualization method 300, conversion engine 202 converts train data to one or more train metrics using one or more algorithms stored in algorithms data 220. Conversion engine 202 stores one or more train metrics in cache of one or more processors 156 and/or associated memory of computer 150, not in database 114.

At activity 310 of train detection and alert visualization method 300, estimation engine 204 estimates the time until the train arrives at the intersection, the time until the train clears the intersection, and the time until the one or more mapping devices 120 arrive at the intersection, using one or more algorithms stored in algorithms data 220. Estimation engine 204 stores one or more train estimations in cache of one or more processors 156 and/or associated memory of computer 150, not in database 114.

At activity 312 of train detection and alert visualization method 300, error correction engine 206 checks for error correction by retrieving current train data from one or more detector devices 130, comparing to previous train data stored in cache of one or more processors 156 and/or associated memory of computer 150 and generating a train data variation.

At activity 314 of train detection and alert visualization method 300, error correction engine 206 determines whether an error is detected. When the train data variation exceeds the error threshold in error thresholds data 226, train alert system 110 returns to activity 308 of train detection and alert visualization method 300 and converts train data to one or more train metrics. When the train data variation does not exceed the error threshold, train alert system 110 proceeds to activity 316 of train detection and alert visualization method 300 and applies rules.

At activity 316 of train detection and alert visualization method 300, rules engine 208 applies one or more rules stored in conditions data 216 to vehicle data 218, mapping device location data 222, and one or more train metrics.

At activity 318 of train detection and alert visualization method 300, rules engine 208 determines whether one or more rules are satisfied. when one or more rules are violated, rules engine 208 communicate to alert engine 210 that one or more alerts should not be sent to one or more mapping devices 120 associated with the violation and train alert system 110 returns to activity 306 of train detection and alert visualization method 300 and captures train data. When none of one or more rules are violated, train alert system 110 proceeds to activity 320 of train detection and alert visualization method 300 and generates and sends alert visualizations.

Figure 6:
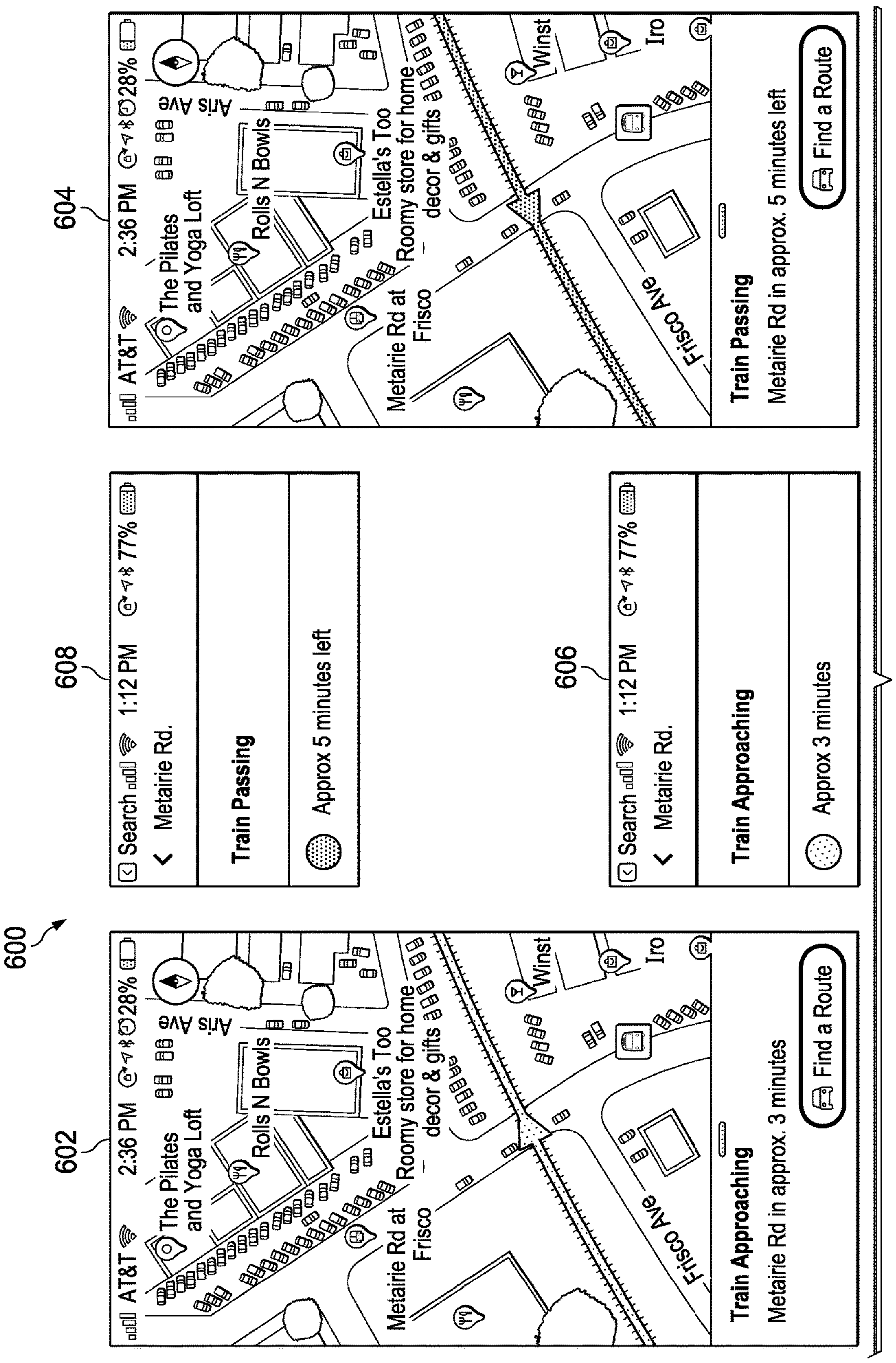
FIG. 6 illustrates an exemplary train alert visualization, in accordance with an embodiment.

At activity 320 of train detection and alert visualization method 300, alert engine 210 generates and sends alert visualizations, illustrated by FIG. 6, suitable for output on one or more displays 124, to visualize one or more alerts. Train alert system 110 then terminates train detection and alert visualization method 300.

To illustrate the operation of train alert system 110 executing the actions of train detection and alert visualization method 300, the following example is provided. In this example, train alert system 110 receives data including operability of three sensors 136 and several status data packets from three corresponding detector devices 130, captures various train data from each of three sensors 136, and generates and sends various alert visualizations to one mapping device 120 that includes four visualizations (two messages, two overlays). Although a particular example of train alert system 110 generating and sending alert visualizations is provided herein, embodiments contemplate train alert system 110 implementing the actions of train detection and alert visualization method 300 in any order and with respect to any data, devices, arrangements, or other circumstances, according to particular needs.

In this example, at activity 302 of train detection and alert visualization method 300, data capture engine 200 receives data including operability of three sensors 136 and data packets from three corresponding detector devices 130. In this example, three sensors 136 are each arranged individually at different locations, illustrated by FIG. 4. Data capture engine 200 stores data including operability of three sensors 136 in operability data 212 and data packets from three corresponding detector devices 130 in status data 214 of train alert system database 114.

Figure 4:
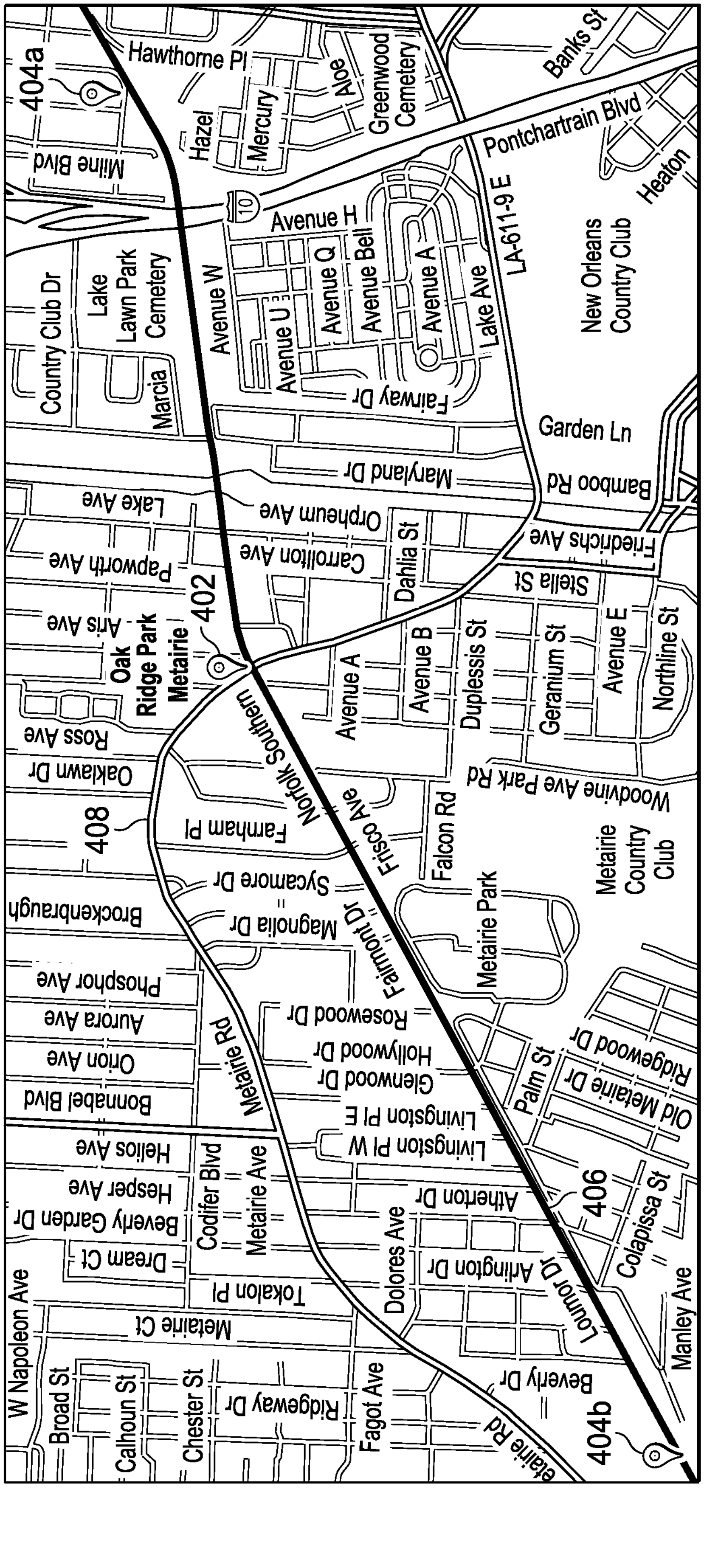
FIG. 4 illustrates an exemplary sensor location arrangement, in accordance with an embodiment.

FIG. 4 illustrates an exemplary sensor location arrangement, in accordance with an embodiment. In an embodiment, sensor location arrangement 400 comprises intersection of interest 402, sensor locations 404*a*-404*b*, train track 406, and roadway of interest 408. Although sensor location arrangement 400 is illustrated and described as comprising a single intersection of interest 402, two sensor locations 404*a*-404*b*, a single train track 406, and a single roadway of interest 408, embodiments contemplate sensor location arrangement 400 in any configuration with any number of intersections of interest 402, sensor locations 404, train tracks 406, and roadways of interest 408, according to particular needs. In this example, sensor locations 404*a*-404*b* are positioned approximately one mile in either direction from intersection of interest 402 and adjacent to train track 406.

Continuing the example, at activity 304 of train detection and alert visualization method 300, data capture engine 200 determines that no train is present at any of three sensors 136 based on status data 214. In this example, data capture engine 200 communicates to the mobile application server of mapping system 140, using mapping systems APIs 224, that no train is approaching intersection of interest 402. The mobile application server of mapping system 140 sends this information to a mobile application running on mapping device 120.

Continuing the example, returning to activity 302 of train detection and alert visualization method 300, data capture engine 200 receives new data packets from three detector devices 130 and stores in status data 214.

Continuing the example at activity 304 of train detection and alert visualization method 300, data capture engine 200 determines that a train is present at sensor location 404*a*.

Continuing the example at activity 306 of train detection and alert visualization method 300, data capture engine 200 continually captures train data from sensor 136 at sensor location 404*a*. Data capture engine 200 retrieves the location of mapping device 120 and data indicating mapping device 120 is in a motor vehicle, illustrated by FIG. 5, from mapping system 140 using mapping system APIs 224.

FIG. 5 illustrates an exemplary data capture arrangement, in accordance with an embodiment. In an embodiment, data capture arrangement 500 comprises mapping device vehicle 502, train of interest 504, and sensor 136. Although data capture arrangement 500 is illustrated and described as comprising a single mapping device vehicle 502, a single train of interest 504, and a single sensor 136, embodiments contemplate data capture arrangement 500 in any configuration with any number of mapping device vehicles 502, trains of interest 504, and sensors 136, according to particular needs. In this example, sensor 136 is directed towards train track 406.

Continuing the example, at activity 308 of train detection and alert visualization method 300, conversion engine 202 converts train data from sensor location 404*a* to one or more train metrics using one or more algorithms stored in algorithms data 220. Conversion engine 202 stores one or more train metrics in cache of one or more processors 156 and/or associated memory of computer 150, not in database 114.

Continuing the example, at activity 310 of train detection and alert visualization method 300, estimation engine 204 estimates the time until train of interest 504 arrives at the intersection of interest 402 using one or more algorithms stored in algorithms data 220. Estimation engine 204 stores one train estimation in cache of one or more processors 156 and/or associated memory of computer 150, not in database 114.

Continuing the example, at activity 312 of train detection and alert visualization method 300, error correction engine 206 retrieves current train data from detector device 130 at sensor location 404*a*. Error correction engine 206 compares current train data, showing train of interest 504 speed as 100 miles per hour, with previous train data, showing train of interest 504 speed as 99 miles per hour, and generates a train data variation of 1%.

Continuing the example, at activity 314 of train detection and alert visualization method 300, error correction engine 206 does not detect an error as the train data variation of 1% does not exceed the error threshold of 5% in error thresholds data 226.

Continuing the example, at activity 316 of train detection and alert visualization method 300, rules engine 208 applies one or more rules stored in conditions data 216 to vehicle data 218, mapping device location data 222, and one or more train metrics. In this example, mapping device 120 is in mapping device vehicle 502, mapping device vehicle 502 is within a predetermined distance of one mile from intersection of interest 402, mapping device 120 has elected to receive alerts, and mapping device vehicle 502 is on roadway of interest 408.

Continuing the example, at activity 318 of train detection and alert visualization method 300, error correction engine 206 determines all rules are satisfied.

Continuing the example, at activity 320 of train detection and alert visualization method 300, alert engine 210 generates and sends train alert visualizations 600, illustrated by FIG. 6, suitable for output on one or more displays 124, to visualize one or more alerts.

FIG. 6 illustrates an exemplary train alert visualization, in accordance with an embodiment. In an embodiment, train alert visualization 600 may display crossing arrival time overlay 602, crossing clear time overlay 604, crossing arrival time message 606, and crossing clear time message 608. Although train alert visualization 600 is illustrated and described as comprising a single crossing arrival time overlay 602, a single crossing clear time overlay 604, a single crossing arrival time message 606, and a single crossing clear time message 608, embodiments contemplate alert engine 210 generating and sending train alert visualizations 600 in any configuration, according to particular needs.

Continuing the example, when mapping device vehicle 502 is one mile from intersection of interest 402, mapping device 120 receives crossing arrival time overlay 602 visualizing an estimate that the train of interest 504 will arrive at intersection of interest 402 in three minutes. When mapping device vehicle 502 is a quarter mile from intersection 402, mapping device 120 receives crossing clear time overlay 604 visualizing an estimate that the train of interest 504 will clear the intersection of interest 402 in five minutes. When the train of interest 504 clears the intersection of interest 402 and eventually clears sensor location 404*b*, train alert system 110 terminates train detection and alert visualization method 300.

In a second example, as train of interest 504 passes through intersection of interest 402, the train of interest 504 speed decreases from 99 miles per hour to 0 miles per hour. At activity 320, alert engine 210 generates and sends an alert visualization indicating that the train has stopped and the crossing clear time is unknown. Train alert system 110 stores train length in cache of one or more processors 156 and/or associated memory of computer 150, not in database 114, to provide to estimation engine 204 when train of interest 504 begins moving. After a predetermined amount of time of train of interest 504 blocking intersection of interest 402, train alert system 110 overwrites any train data, train metrics, or train estimations in cache of one or more processors 156 and/or associated memory of computer 150. Alert engine 210 generates and sends an alert visualization indicating that train of interest 504 is experiencing an extended blockage and no estimates will be provided until train of interest 504 clears intersection of interest 402.

Reference in the foregoing specification to “one embodiment”, “an embodiment”, or “some embodiments” means that a particular feature, structure, or characteristic described in connection with the embodiment is included in at least one embodiment of the invention. The appearances of the phrase “in one embodiment” in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A method of providing train detection and alerts, comprising:

monitoring, by a computer comprising a processor and a memory, train status data;

detecting, by one or more detector devices, a presence of a train based on the train status data;

capturing, by the computer, in response to the detecting of an indication of a train, current train data;

converting, by the computer, in response to the capturing, the current train data and mapping device location data from one or more mapping devices into train metrics;

estimating, by the computer, in further response to the converting, an arrival time of the train at a railroad crossing and a duration of the train at the railroad crossing;

checking, by the computer, the current train data for errors;

applying, by the computer, rules to the current train data and to the mapping device location data, wherein a rule of the rules comprises that a particular mapping device has not elected to receive alerts;

generating, by the computer, an alert in response to none of the rules being violated, wherein the alert comprises a visualization of a direction the train is moving with respect to the railroad crossing;

sending, by the computer, the alert to one or more mapping devices whose rules have not been violated; and displaying the alert on the one or more mapping devices to notify one or more corresponding users of the one or more mapping devices of the presence of the train.

2. The method of claim 1, wherein the alerts further comprise displaying one or more of:

a direction the train is moving;

an estimated time until the train arrives at the railroad crossing;

an estimated time until the train clears the railroad crossing;

one or more alternate routes to avoid the train; and an indication that an extended blockage associated with the train has occurred.

3. The method of claim 1, wherein the train metrics comprise one or more of:

a train presence;

a train location;

a train speed;

a train directionality;

a train length;

a train extended blockage;

a train reversal; and a distance between a mapping device of the one or more mapping devices and a particular location.

4. The method of claim 1, wherein checking the current train data for errors further comprises:

comparing the current train data to previously stored train data to generate a train data variation;

comparing the train data variation to an error threshold; and generating one or more updated train metrics, in response to the train data variation exceeding the error threshold.

5. The method of claim 1, wherein the rules further comprise one or more of:

not displaying the alert when a mapping device is not within a predetermined distance from an intersection of interest;

not displaying the alert when a mapping device is not on a particular road;

not displaying the alert when a mapping device is not in an operating motor vehicle; and not displaying the alert when a mapping device has not elected to receive alerts.

6. The method of claim 1, wherein the one or more detector devices utilize one or more sensors selected from a group consisting of:

a radar system;

an imaging sensor;

a camera;

a LIDAR system;

an infrared detector; and a sonar system.

7. The method of claim 1, wherein the alert comprises one or more of:

a text indicating an estimated time until the train arrives at an intersection of interest;

a text indicating an estimated time until the train clears an intersection of interest;

a text indicating an estimated time until a mapping device of the one or more mapping devices arrives at an intersection of interest;

alternate routes to avoid an incoming or passing train at an intersection of interest; and a text indicating an extended blockage at an intersection of interest.

8. A train detection and alert system, comprising one or more mapping devices and one or more detector devices operably connected over a network to a computer comprising a memory and a processor, the system further configured to:

monitor train status data;

detect, by the one or more detector devices, a presence of a train based on the train status data;

capture, in response to the detecting of an indication of a train, current train data;

convert, in response to the capturing, the current train data and mapping device location data from the one or more mapping devices into train metrics;

estimate in further response to the converting, an arrival time of the train at a railroad crossing and a duration of the train at the railroad crossing;

check the current train data for errors;

apply rules to the current train data and to the mapping device location data, wherein a rule of the rules comprises that a particular mapping device has not elected to receive alerts;

generate an alert in response to none of the rules being violated, wherein the alert comprises a visualization of a direction the train is moving with respect to the railroad crossing;

send the alert to one or more mapping devices whose rules have not been violated; and display the alert on the one or more mapping devices to notify one or more corresponding users of the one or more mapping devices of the presence of the train.

9. The system of claim 8, wherein the alerts further comprise a display of one or more of:

a direction the train is moving;

an estimated time until the train arrives at the railroad crossing;

an estimated time until the train clears the railroad crossing;

one or more alternate routes to avoid the train; and an indication that an extended blockage associated with the train has occurred.

10. The system of claim 8, wherein the train metrics comprise one or more of:

a train presence;

a train location;

a train speed;

a train directionality;
a train length;
a train extended blockage;
a train reversal; and
a distance between a mapping device of the one or more mapping devices and a particular location.

11. The system of claim 8, wherein checking the current train data for errors further comprises:
compare the current train data to previously stored train data to generate a train data variation;
compare the train data variation to an error threshold; and
generate one or more updated train metrics, in response to the train data variation exceeding the error threshold.

12. The system of claim 8, wherein the rules further comprise one or more of:
not displaying the alert when a mapping device is not within a predetermined distance from an intersection of interest;
not displaying the alert when a mapping device is not on a particular road;
not displaying the alert when a mapping device is not in an operating motor vehicle; and
not displaying the alert when a mapping device has not elected to receive alerts.

13. The system of claim 8, wherein the one or more detector devices utilize one or more sensors selected from a group consisting of:
a radar system;
an imaging sensor;
a camera;
a LIDAR system;
an infrared detector; and
a sonar system.

14. The system of claim 8, wherein the alert comprises one or more of:
a text indicating an estimated time until the train arrives at an intersection of interest;
a text indicating an estimated time until the train clears an intersection of interest;
a text indicating an estimated time until a mapping device of the one or more mapping devices arrives at an intersection of interest;
alternate routes to avoid an incoming or passing train at an intersection of interest; and
a text indicating an extended blockage at an intersection of interest.

15. A non-transitory computer-readable medium embodied with software for providing train detection and alerts, the software when executed is programmed to:
network a computer comprising a processor and a memory with one or more mapping devices and one or more detector devices;
data;
monitor train status data;
detect, by the one or more detector devices, a presence of a train based on the train status data;
capture, in response to the detecting of an indication of a train, current train data;
convert, in response to the capturing, the current train data and mapping device location data from the one or more mapping devices into train metrics;
estimate in further response to the converting, an arrival time of the train at a railroad crossing and a duration of the train at the railroad crossing;
check the current train data for errors;
apply rules to the current train data and to the mapping device location data, wherein a rule of the rules comprises that a particular mapping device has not elected to receive alerts;
generate an alert in response to none of the rules being violated, wherein the alert comprises a visualization of a direction the train is moving with respect to the railroad crossing;
send the alert to one or more mapping devices whose rules have not been violated; and
display the alert on the one or more mapping devices to notify one or more corresponding users of the one or more mapping devices of the presence of the train.

16. The non-transitory computer-readable medium of claim 15, wherein the alerts further comprise a display of one or more of:
a direction the train is moving;
an estimated time until the train arrives at the railroad crossing;
an estimated time until the train clears the railroad crossing;
one or more alternate routes to avoid the train; and
an indication that an extended blockage associated with the train has occurred.

17. The non-transitory computer-readable medium of claim 15, wherein the train metrics comprise one or more of:
a train presence;
a train location;
a train speed;
a train directionality;
a train length;
a train extended blockage;
a train reversal; and
a distance between a mapping device of the one or more mapping devices and a particular location.

18. The non-transitory computer-readable medium of claim 15, wherein checking the current train data for errors further comprises:
compare the current train data to previously stored train data to generate a train data variation;
compare the train data variation to an error threshold; and
generate one or more updated train metrics, in response to the train data variation exceeding the error threshold.

19. The non-transitory computer-readable medium of claim 15, wherein the rules further comprise one or more of:
not displaying the alert when a mapping device is not within a predetermined distance from an intersection of interest;
not displaying the alert when a mapping device is not on a particular road;
not displaying the alert when a mapping device is not in an operating motor vehicle; and
not displaying the alert when a mapping device has not elected to receive alerts.

20. The non-transitory computer-readable medium of claim 15, wherein the alert comprises one or more of:
a text indicating an estimated time until the train arrives at an intersection of interest;
a text indicating an estimated time until the train clears an intersection of interest;
a text indicating an estimated time until a mapping device of the one or more mapping devices arrives at an intersection of interest;

alternate routes to avoid an incoming or passing train at an intersection of interest; and a text indicating an extended blockage at an intersection of interest.

* * * * *